(12) United States Patent
Xiao

(10) Patent No.: US 6,795,774 B2
(45) Date of Patent: Sep. 21, 2004

(54) METHOD FOR ASYMPTOTIC DIPPING CORRECTION

(75) Inventor: Jiaqi Xiao, Houston, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 0 days.

(21) Appl. No.: 10/283,704

(22) Filed: Oct. 30, 2002

(65) Prior Publication Data

US 2004/0088114 A1 May 6, 2004

(51) Int. Cl.$^7$ ............................................ G01V 3/18
(52) U.S. Cl. .................................... 702/7; 702/10
(58) Field of Search ................... 702/7, 10; 324/339, 324/343; 703/6, 10, 14

(56) References Cited

U.S. PATENT DOCUMENTS

| | | | | |
|---|---|---|---|---|
| 4,360,777 A | * | 11/1982 | Segesman | 324/339 |
| 5,115,198 A | | 5/1992 | Gianzero et al. | 324/339 |
| 5,184,079 A | | 2/1993 | Barber | 324/339 |
| 5,329,448 A | | 7/1994 | Rosthal | 364/422 |
| 5,757,191 A | | 5/1998 | Gianzero | 324/339 |
| 5,774,360 A | | 6/1998 | Xiao et al. | 702/6 |
| 6,047,240 A | | 4/2000 | Barber et al. | 702/10 |
| 6,163,155 A | | 12/2000 | Bittar | 324/338 |
| 6,216,089 B1 | | 4/2001 | Minerbo | 702/7 |
| 6,219,619 B1 | | 4/2001 | Xiao et al. | 702/7 |
| 6,304,086 B1 | | 10/2001 | Minerbo et al. | 324/338 |
| 6,307,199 B1 | | 10/2001 | Edwards et al. | 250/269.3 |
| 6,393,364 B1 | | 5/2002 | Gao et al. | 702/7 |
| 6,442,488 B2 | | 8/2002 | Xiao et al. | 702/9 |
| 2001/0039477 A1 | | 11/2001 | Xiao et al. | 702/6 |

OTHER PUBLICATIONS

H. G. Doll, Introduction to Induction Logging and Application to Logging of Wells Drilled with Oil Base Mud, Jun. 1949, pp. 148–162; Paper presented at AIME Annual Meeting in San Francisco Feb. 13–17, 1949.

Induction Theory, Halliburton Training Manual, Oct. 25, 1996, pp. 1–12.

* cited by examiner

Primary Examiner—Donald McElheny
(74) Attorney, Agent, or Firm—Conley Rose, P.C.

(57) ABSTRACT

Induction and other resistivity well logging tools determine formation conductivity at various depths but these measurements contain pronounced errors when the tool is proximate to an inclined underground bed boundary. A method to correct tool measurements includes calculating an expected tool response at a relative dip angle of zero degree and at a particular depth based on an earth model of the underground formation. An expected tool response at the known dip is then calculated. Comparing the calculated zero-dip response with the calculated non-zero-dip response yields the dip effect. A response is also modeled to exclude the non-linearity of the shoulder effect. Comparing the calculated linear response (obtained, e.g. by the Born approximation) with the calculated zero-dip response yields the nonlinear shoulder effect. The nonlinear shoulder effect and/or the dip effect may then be corrected for by subtracting them from the raw or pre-processed measurements.

26 Claims, 7 Drawing Sheets

METHOD FOR ASYMPTOTIC DIPPING CORRECTION

CROSS-REFERENCE TO RELATED APPLICATIONS

Not applicable.

STATEMENT REGARDING FEDERALLY SPONSORED RESEARCH OR DEVELOPMENT

Not applicable.

BACKGROUND OF THE INVENTION

1. Field of the Invention

The present invention is directed to induction well logging. More particularly, the invention relates to a correction method for induction well logging measurements.

2. Background of the Invention

Modern petroleum drilling and production operations demand a great quantity of information relating to parameters and conditions downhole. Such information typically includes characteristics of the earth formations traversed by the wellbore, in addition to data relating to the size and configuration of the borehole itself. The collection of information relating to conditions downhole, which commonly is referred to as "logging," can be performed by several methods. Oil well logging has been known in the industry for many years as a technique for providing information to a driller regarding the particular earth formation being drilled. In conventional oil well wireline logging, a probe or "sonde" is lowered into the borehole after some or all of the well has been drilled, and is used to determine certain characteristics of the formations traversed by the borehole. The sonde may include one or more sensors to measure parameters downhole and typically is constructed as a hermetically sealed cylinder for housing the sensors, which hangs at the end of a long cable or "wireline." The cable or wireline provides mechanical support to the sonde and also provides an electrical connection between the sensors and associated instrumentation within the sonde, and electrical equipment located at the surface of the well. Normally, the cable supplies operating power to the sonde and is used as an electrical conductor to transmit information signals from the sonde to the surface. In accordance with conventional techniques, various parameters of the earth's formations are measured and correlated with the position of the sonde in the borehole, as the sonde is pulled uphole.

The sensors used in a wireline sonde usually include a source device for transmitting energy into the formation, and one or more receivers for detecting the energy reflected from the formation. Various sensors have been used to determine particular characteristics of the formation, including nuclear sensors, acoustic sensors, and electrical sensors.

For a formation to contain petroleum, and for the formation to permit the petroleum to flow through it, the rock comprising the formation must have certain well-known physical characteristics. One characteristic is that the formation has a certain measurable resistivity (or conductivity), which can be determined by inducing an alternating electromagnetic field into the formation by a transmitter coil arrangement. The electromagnetic field induces alternating electric (or eddy) currents in the formation in paths that are substantially coaxial with the transmitter. These currents in turn create a secondary electromagnetic field in the medium, inducing an alternating voltage at the receiver coil. If the current in the transmitter coil is kept constant, the eddy current intensity is proportional to the conductivity of the formation. Consequently, the conductivity of the formation determines the intensity of the secondary electromagnetic field, and thus, the amplitude of the voltage at the receiver coil.

A number of different induction tools are known in the art. One known induction tool is the "high resolution array induction tool" or HRAI as taught in U.S. Ser. No. 09/460,553, U.S. Pat. No. 6,606,565, filed Dec. 14, 1999, which is hereby incorporated by reference for all purposes. This is an array induction tool, operating with two frequencies and ten subarrays of six characteristic spacings. HRAI raw measurements are processed through skin-effect correction, borehole correction and software focusing to provide logs of six depth of investigation (10", 20", 30", 60", 90", and 120") with three vertical resolutions (1 ft, 2 ft and 4 ft). The use of this tool is not a limitation on the invention, however.

Figure 1:
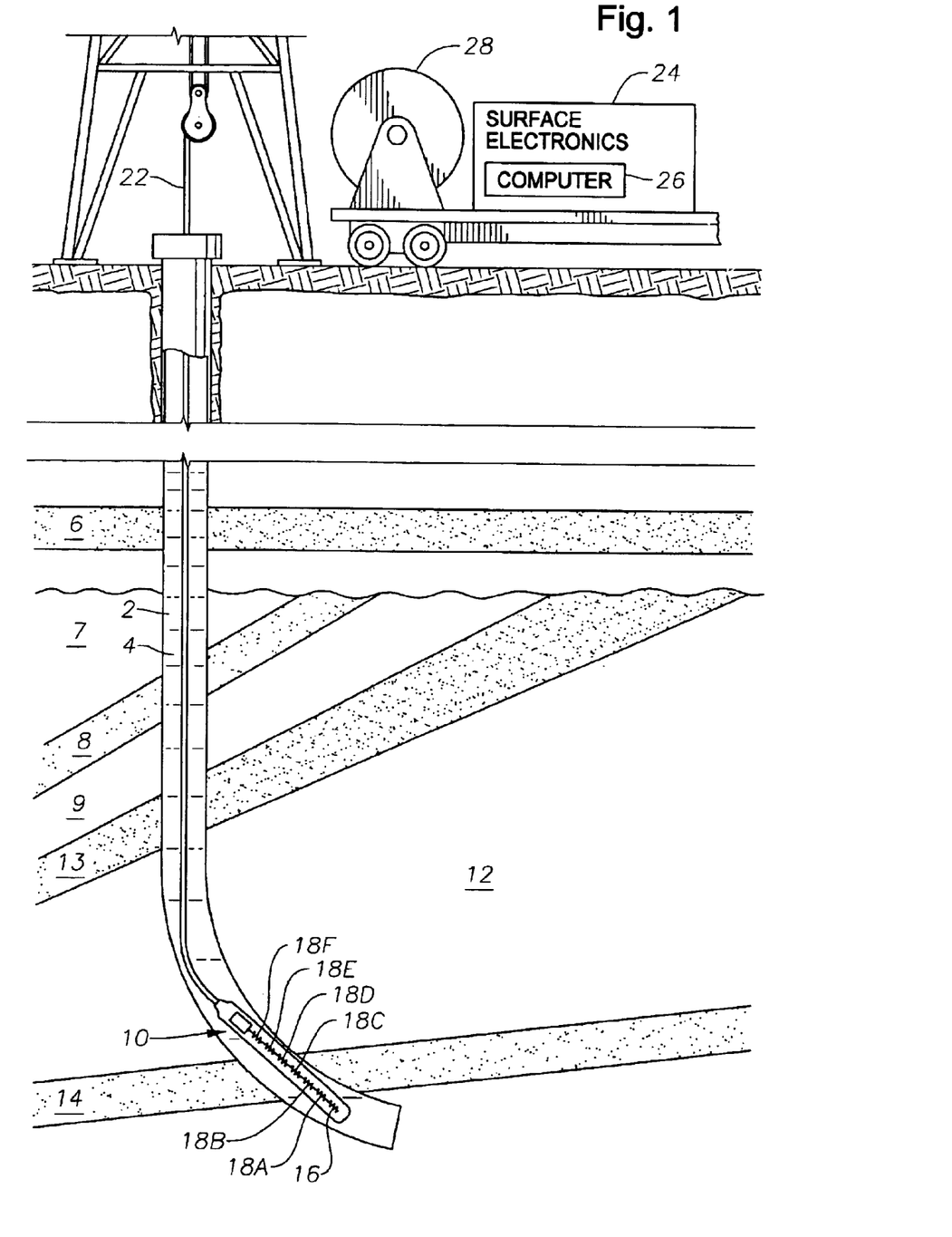
FIG. 1 shows an induction well logging instrument disposed in a wellbore penetrating earth formations having various relative inclinations with respect to the axis of the instrument.

FIG. 1 shows an induction well logging instrument 10 disposed in a wellbore 2 drilled through earth formations. The earth formations are shown generally at 6, 7, 8, 9, 12, 13 and 14. The instrument 10 is typically lowered into the wellbore 2 at one end of an armored electrical cable 22 by means of a winch 28 or similar device known in the art.

The instrument 10 can include a telemetry/signal processing unit 20 (SPU).

The SPU 20 can include a source of alternating current (not shown separately). The alternating current is generally conducted through a transmitter 16 disposed on the instrument 10. Receivers 18A–18F can be disposed at axially spaced apart locations along the instrument 10. The SPU 20 can include receiver circuits (not shown separately) connected to the receivers 18A–18F for detecting voltages induced in each of the receivers 18A–18F. The SPU 20 can also impart signals to the cable 22 corresponding to the magnitude of the voltages induced in each of the receivers 18A–18F. It is to be understood that the number of transmitters and receivers, and the relative geometry of the transmitter 16 and the receivers 18A–18F shown in the instrument in FIG. 1 is not meant to be a limitation on the invention.

As is understood by those skilled in the art, the alternating current passing through the transmitter 16 induces eddy currents in the earth formations 6, 7, 8, 9, 12, 13, 14. The eddy currents correspond in magnitude both to the electrical conductivity of the earth formations 6, 7, 8, 9, 12, 13, 14 and to the relative position of the particular earth formation with respect to the transmitter 16. The eddy currents in turn induce voltages in the receivers 18A–18F, the magnitude of which depends on both the eddy current magnitude and the relative position of the earth formation with respect to the individual receiver 18A–18F.

The signals, corresponding to the voltages induced in each receiver 18A–18F, can be transmitted along the cable 22 to surface electronics 24. The surface electronics 24 can include detectors (not shown separately) for interpreting the signals transmitted from the instrument 10, and a computer 26 to perform the process according to the present invention on the signals transmitted thereto. It is to be understood that the SPU 20 could also be programmed to perform the process of the present invention.

The voltages induced in each receiver 18A–18F correspond to apparent electrical conductivity of all of the media surrounding the instrument 10. The media comprise the earth formations 6, 7, 8, 9, 12, 13, 14 and the drilling mud 4 in the wellbore 2. The degree of correspondence between the voltages induced in a particular receiver, and the electrical conductivity of the particular earth formation axially disposed between the particular receiver and the transmitter 16, can depend on the relative inclination of the layers of the earth formations, such as formation 12, and the axis of the instrument 10.

The eddy currents induced by the transmitter coils tend to flow in circular paths that are coaxial with the transmitter coils. For a vertical borehole traversing horizontal formations, each line of current flow ideally remains in the same formation along its entire flow path, and never crosses a bed boundary. Thus, one simplifying assumption that is made in relating the receiver voltage measurements to the conductivity of the earth formations is that the ground loops are positioned entirely within a portion of the earth formation having substantially circumferentially uniform conductivity. This assumption fails in cases where layers of the earth formations are not perpendicular to, but are inclined with respect to, the axis of the wellbore (and consequently the axis of the instrument). A boundary separates two layers which can have different conductivities. When the ground loops cross one or more bed boundaries, errors are introduced into the tool response. This is known as the "dipping effect".

The dipping effect is classified into two components: the charge component and the volumetric component. The charge component is caused by an electric charge buildup when the induced eddy currents flow across inclined formation interfaces. Quantitatively, the charge component depends on the inner product of the electric field vector and the directional derivative of the formation conductivity. The volumetric component is caused by the fact that eddy currents take paths through formations of different conductivities.

Another tool error is commonly known as the "nonlinear shoulder effect." As the induction well tool (also referred to as an induction well instrument) traverses the wellbore it commonly approaches, crosses, and then passes bed boundaries between formation layers. While the induction tool is proximate these bed boundaries, a portion of the receiver response comes from the bed or beds adjacent the bed in which the tool lies, introducing error into the measurements. It has been established that a portion of this tool response error in the regions proximate bed boundaries is non-linear. This nonlinearity makes it difficult to evaluate exactly the response portion that is from the adjacent bed, leading to an incorrect evaluation of the conductivity of the bed of interest.

Thus, an induction tool at an angle to a formation bed produces a series of inaccurate measurements. The larger the dip angle, the less accurate is the measurement with depth. Further, the log includes polarization "horns", which correspond to the charge effect.

The measurements from induction tools are used to create formation resistivity well logs. Formation resistivity well logs are commonly used to map subsurface geologic structures and to infer the fluid content within pore spaces of earth formations. Formation resistivity well logs include electromagnetic induction logs. Of course, if not corrected for, the dipping error and shoulder bed error made in the raw measurements are reflected by inaccuracies in the formation resistivity well logs.

There exist several pieces of literature that address the problem of correcting for dipping error and shoulder bed effect. However, much of the discussion is centered around solutions that are inaccurate, or slow, or complicated. Further, resistivity log interpretation techniques were originally developed for vertical wells. Most of the methods in the literature that attempt to correct for at least a portion of the dipping error and shoulder bed effect error are incompatible with, or at least unduly complicate, these previous resistivity log interpretation techniques.

Ideally, a logging system and/or method could be devised that would solve for one or both of the dip error and nonlinear shoulder effect by a simple, straightforward and fast technique. Such a technique could be used during, for example, logging while drilling to make more accurate steering decisions.

BRIEF SUMMARY OF SOME OF THE PREFERRED EMBODIMENTS

The problems noted above are solved in large part by a method that determines dip error based on modeling or describing tool response at a depth-of-interest both with and without dip. The difference between the two modeled responses is defined as the dip error.

Another method determines shoulder effect error based on modeling tool response at a depth-of-interest without dip and modeling tool response with the elimination of the linear component of the shoulder bed effect. The difference between the two modeled responses is the non-linear component of the shoulder bed effect.

These methods may also be integrated into a system including a induction logging tool and a processor.

The disclosed devices and methods comprise a combination of features and advantages which enable it to overcome the deficiencies of the prior art devices. The various characteristics described above, as well as other features, will be readily apparent to those skilled in the art upon reading the following detailed description, and by referring to the accompanying drawings.

BRIEF DESCRIPTION OF THE DRAWINGS

For a detailed description of the preferred embodiments of the invention, reference will now be made to the accompanying drawings in which.

DETAILED DESCRIPTION OF THE PREFERRED EMBODIMENTS

The invention is a simple, fast, and effective means to correct for well logging error. The disclosed embodiments numerically forward model a zero dip tool response at a particular depth to provide a baseline or basis for comparison to which other measurements or calculations can be compared. The difference of this comparison indicates the magnitude of the measurement error in question. Because the invention has the capability of being fast and accurate, it can be used in the logging while drilling environment as well as wireline logging.

Figure 2:
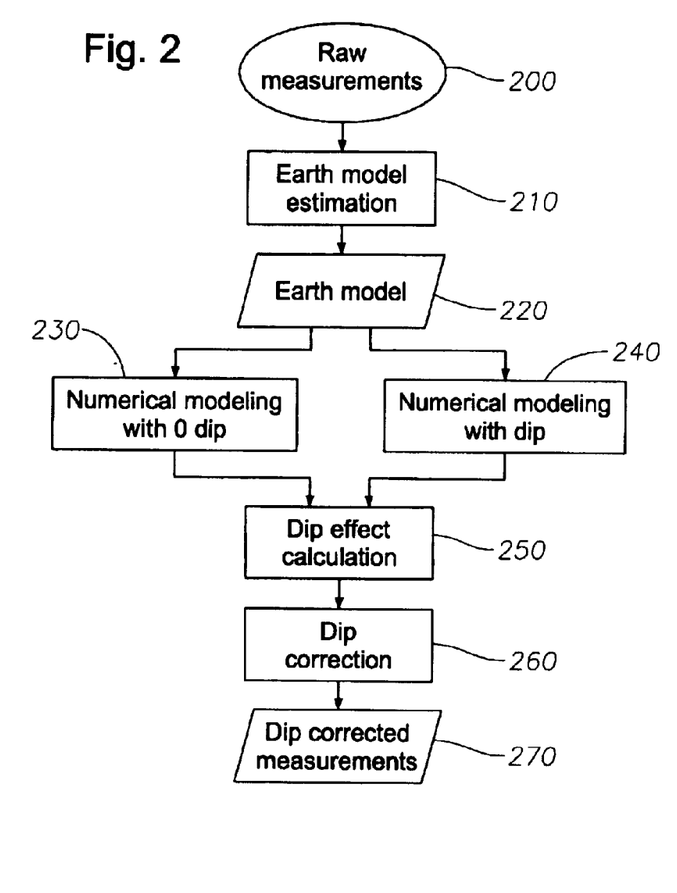
FIG. 2 shows a first method according to the invention.

FIG. 2 shows a first method according to the invention. At step 200, the raw voltage measurements at the receiver(s) are obtained by the induction logging tool. These raw measurements may optionally be pre-processed by, e.g., filtering or by conversion to a corresponding conductivity, at step 200 as well.

An earth model estimation based upon the raw or pre-processed measurements is made at step 210. Such an earth model indicates the approximate conductivity for each bed or formation layer, as well as the depth of each boundary between the formation layers. Alternately, the earth model may already exist, or may be created from preexisting measurements. As is known to one of ordinary skill in the art, there are a number of approaches, techniques or methods of various accuracies to create the earth model from raw or pre-processed measurements.

Step 220 indicates the complete earth model.

Given the earth model derived at step 220, and an accurate means to model tool response such as forward modeling software, an expected tool response for a given depth in a formation can be numerically calculated. Such software or the like to model tool response will vary depending upon which tool is being modeled by the user. However, numerous such programs have been developed for various tools and it is within the ordinary skill of those in the art to develop such software for any given tool if it is not readily available.

Numerical forward modeling employs knowledge of the formation conductivities proximate to the depth of interest, and a given dip angle (i.e. the relative angle between the tool axis and the normal direction of the formation boundary), to estimate the expected measurement reading for the tool. A dip angle for the real-world tool may be obtained by another instrument within the tool or by any suitable method.

At step 230, numerical forward modeling can be used to calculate the expected apparent conductivity for zero-degree dip angle (i.e., the induction tool being vertical assuming the bed boundary is horizontal) at the depth of interest. The result is referred to as the apparent conductivity at 0 dip, or $\sigma_a^{vertical}$. This measurement provides a baseline or standard for comparison from which the dip effect and nonlinear shoulder effect may be calculated.

At step 240, the expected apparent conductivity is calculated at the same depth as at step 230, but at the given dip angle. The dip angle can be measured by another logging tool, or estimated from well logging data through a well known process. The expected conductivity may be calculated by, e.g., numerical forward modeling at the given dip angle if given the earth model of step 220 and yields $\sigma_a^{dip}$, the apparent conductivity of the tool.

The dip effect calculation is made at step 250. The dip effect estimate is calculated as the difference between the apparent conductivity with zero dip of step 230 and the apparent conductivity with known dip of step 240. In other words:

$$\sigma_a^v - \sigma_a^d = \text{dip effect estimation}$$

where, $\sigma_a^v$=apparent conductivity at zero-degree dip angle; and
$\sigma_a^d$=apparent conductivity at the known dip angle.

The raw measurements are then corrected at step 260 for any given depth by subtracting the magnitude of the estimated dip effect calculated at step 250 from the raw measurement(s). This yields the dip corrected measurement(s) at step 270.

Figure 3:
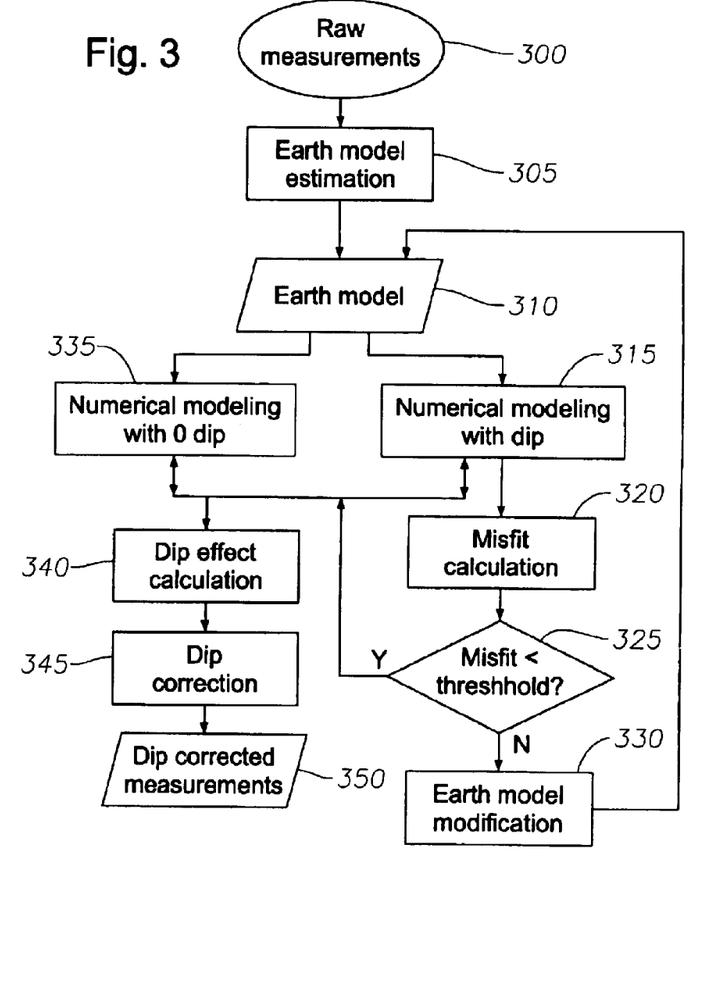
FIG. 3 shows a second method according to the invention.
Figure 4:
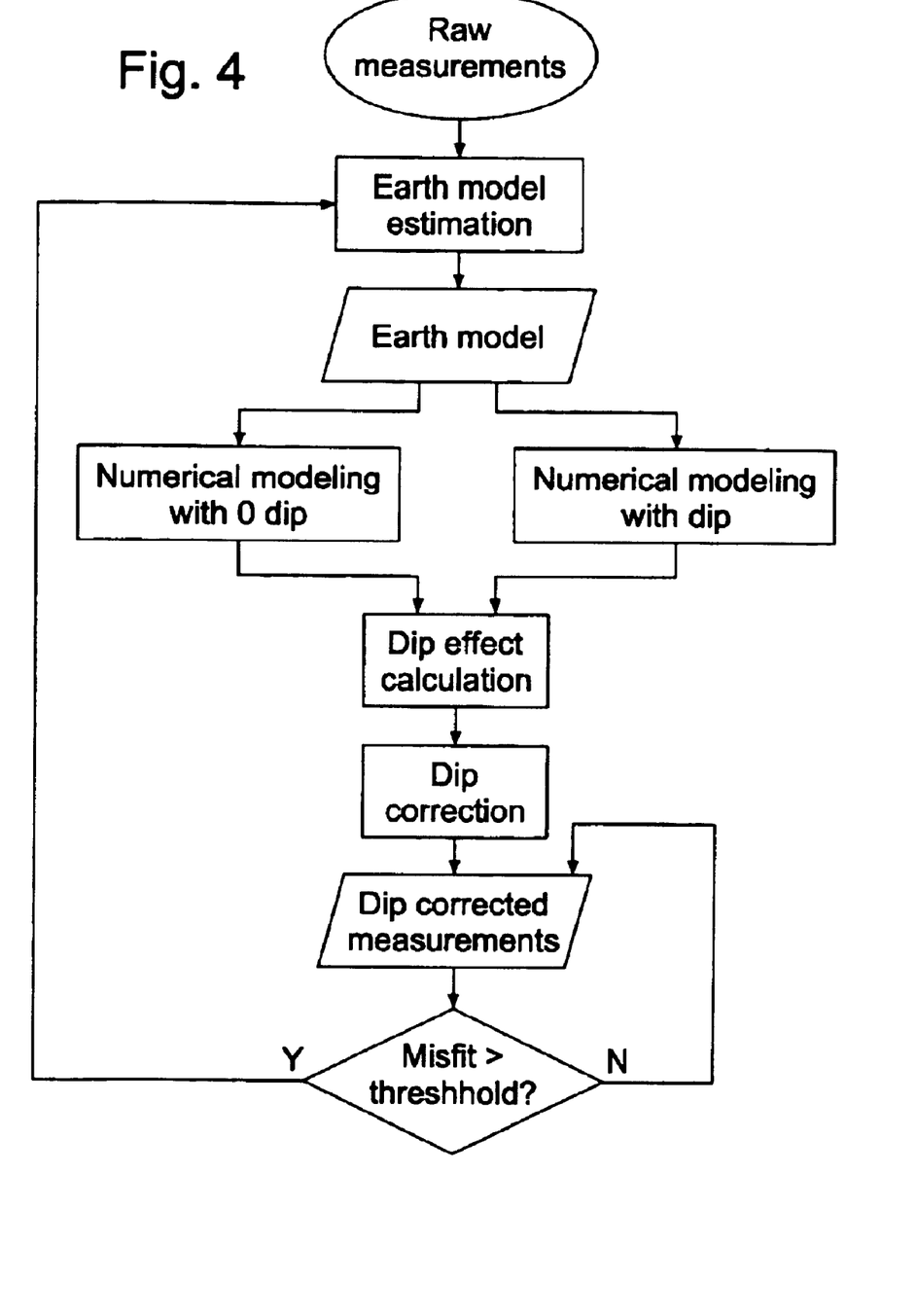
FIG. 4 shows a third method according to the invention.

FIGS. 3 and 4 show methods to correct for the dipping effect that fine tune the estimated formation model. As stated above, the estimated earth model may not be satisfactorily accurate. The earth model estimation may thus be improved by use of one of the following. However, it should be noted that one of the major advantages of the invention is its speed and simplicity. Although the methods of FIGS. 3 and 4 are within the scope of the invention, the additional steps required to improve the earth model estimate tend to complicate and slow the derivation of an estimate of dip error. Depending upon the application, this may or may not be undesirable.

FIG. 3 is a method of the present invention providing an improved earth model estimate. The raw measurements are taken at step 300. These raw measurements may also be pre-processed at step 300 by, e.g., filtering or conversion to conductivity.

An earth model estimation at step 305 yields an earth model at step 310. Alternatively, the earth model may be based on other measurements or may already exist. The apparent conductivity with dip may then be calculated based on the earth model at step 315.

The misfit of the calculated apparent conductivity is calculated at step 320. The difference between the calculated conductivity and the raw measurement conductivity is evaluated or calculated as the misfit. For example, the area between the modeled tool response curve and the raw measurement curve over a range of depths may be defined as the misfit. Alternatively, the misfit may be defined as the greatest difference between the raw measurement curve and the modeled tool response over a range of depths. The misfit could also be the difference at any depth of interest.

Regardless how the misfit is defined, an acceptable misfit threshold can be predetermined. At step 325, the misfit is checked to determine if it is less than this predetermined threshold. If yes, the method proceeds to step 335. If not, an earth model modification is made at step 330. For example, an iterative inversion technique could be used at step 330, as known by those of ordinary skill in the art, that compares the numerical modeling with dip to the raw measurement data, and adjusts the earth model by inversion to return to step 310. The iteration stops when the misfit is smaller than the preset threshold. Then the formation model is considered as a good approximation of the actual formation and is used to calculate the dip effect and the nonlinear shoulder effect.

Either before or after it is determined that the misfit is less than the predetermined threshold, the tool response may be modeled with zero dip at step 335. Obviously, if step 335 is executed prior to or parallel with the determination that the misfit is less than the threshold (step 325), the overall method is likely faster. If step 335 is executed after the determination that the misfit is less than the threshold, then step 335 may be based on a more accurate earth model.

In any event, the difference between the modeled response of a deviated borehole and the modeled response of a vertical fiction borehole is the estimated dip effect. This difference is calculated at step 340, yielding the dip correction at step 345. The raw or pre-processed data are adjusted by this dip correction at step 345, yielding the dip corrected measurements at step 350.

FIG. 4 shows another method according to the invention that refines the earth model. At step 400, the raw measurements at the receiver(s) are obtained by the induction logging tool. These raw measurements may optionally be pre-processed by, e.g., filtering or by conversion to a corresponding conductivity, at step 400 as well.

An earth model estimate based upon the raw measurements is made at step 410. Such an earth model presents the approximate conductivity for each bed or formation layer, as well as the depth of each bed boundary between the formation layers. Alternately, the earth model may already exist, or may be created from preexisting measurements. As is known to one of ordinary skill in the art, there are a number of approaches, techniques or methods of various accuracies to create the earth model.

Step 420 indicates the complete earth model.

Given the earth model derived at step 420, and an accurate means to model tool response such as forward modeling software, an expected tool response for a given depth in a formation can be numerically modeled. This numerical forward modeling employs knowledge of the formation conductivity proximate to a depth of interest, and a given dip angle. The actual dip of an induction well logging tool is typically recorded as the tool is measuring the voltage at a receiver and the actual dip is the dip angle that is used if a dip effect correction for an actual tool measurement is desired. These inputs can then be used to determine the expected measured conductivity at the depth of interest and for the given dip.

At step 430, the expected apparent conductivity is similarly calculated for zero dip (i.e., the induction tool being vertical assuming the bed boundary is horizontal) at the depth-of-interest. This is referred to as the apparent conductivity at 0 dip, or $\sigma_a^{vertical}$. This measurement provides a baseline to which any dip calculation may be compared according to the invention.

At step 440, the expected apparent conductivity is calculated at the same depth as at step 430, but at the dip angle. The dip angle can be measured by another logging tool, or estimated from well logging data through a well known process. The expected conductivity may be calculated by, e.g., numerical forward modeling at the given dip angle if provided the earth model of step 420 and yields $\sigma_a^{dip}$, the apparent conductivity of the tool when it is at the dip angle.

The dip effect calculation is made at step 450. The dip effect is the difference between the apparent conductivity with zero-degree dip angle of step 450 and the apparent conductivity with the known dip of step 440. In other words:

Dip effect=$\sigma_a^v - \sigma_a^d$ estimation where, $\sigma_a^v$=apparent conductivity with zero-degree dip angle; and $\sigma_a^d$=apparent conductivity with the known dip angle.

The dip effect estimated calculation can be made at any desired depth. The raw measurements are then corrected at step 460 for the depth by subtracting the magnitude of the dip effect from the raw measurement. This yields the dip corrected measurement(s) at step 470. This method differs from that of FIG. 2 by the addition of step 480. The dip corrected measurements may be used to reformulate an earth model estimation. This new earth model estimation is then used to determine new dip corrected measurements. This iterative process may be executed as many times as desired but it is believed repeated iterations will lead to diminishing returns and will slow the overall method of asymptotic dipping correction.

Figure 5:
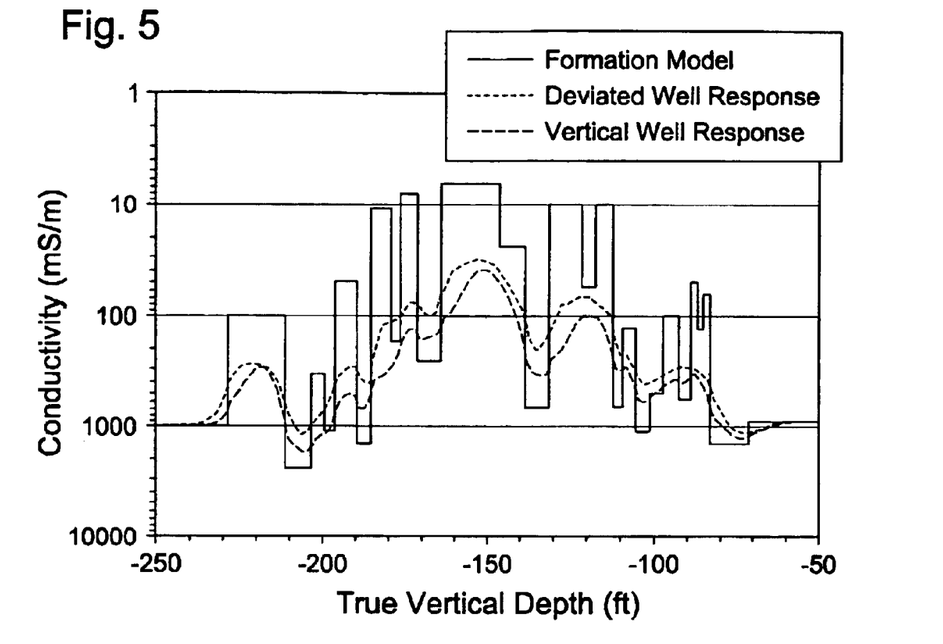
FIG. 5 shows a graph illustrating the magnitude of the dipping effect.
Figure 6:
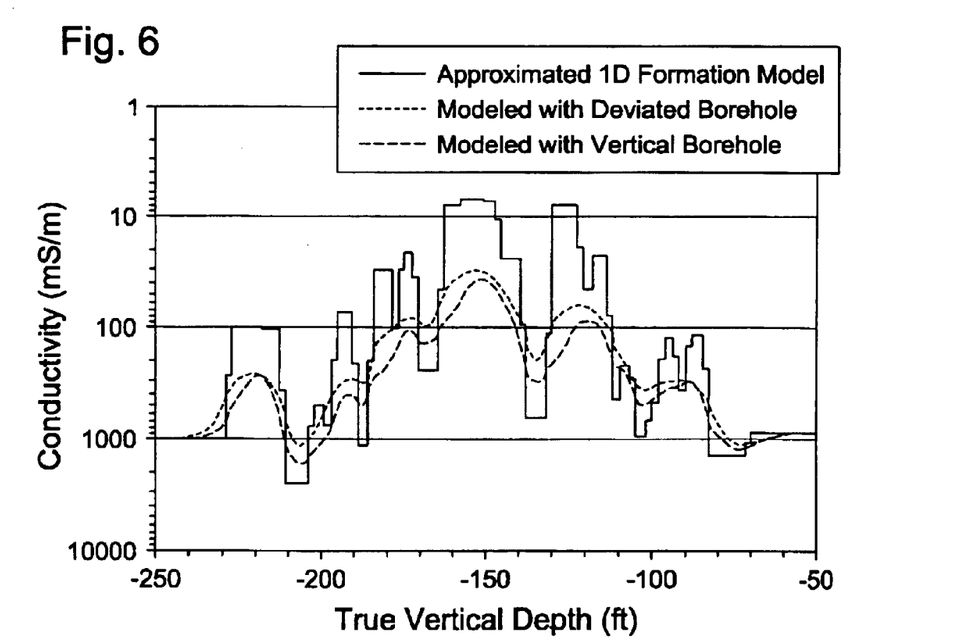
FIG. 6 shows a second graph illustrating the magnitude of the dipping effect.
Figure 7:
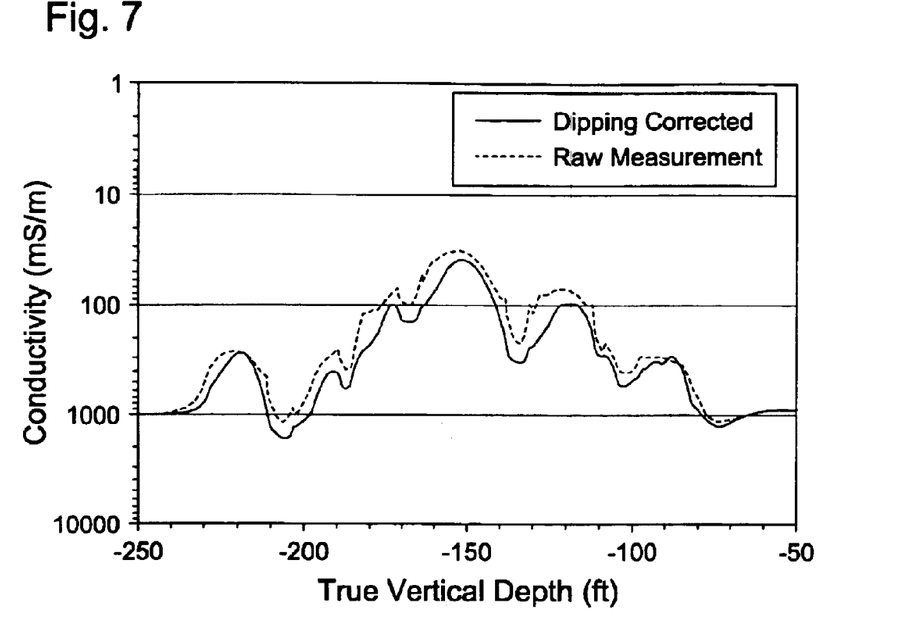
FIG. 7 shows a third graph illustrating a logs before dipping correction and after dipping correction.

An implementation of this method is shown in FIGS. 5–7. FIG. 5 is a graph with the true vertical depth (−250 to −50) along the x-axis and conductivity in mS/m (1 to 10,000) logarithmically shown along the y-axis. The square curve is the true or accurate formation model. Also shown are two other curves. The upper curve is the modeled response of an induction tool in a deviated fictional wellbore with a 60-degree dip angle. The lower curve is the modeled response of the same induction tool in a vertical (i.e. zero dip) fictional borehole. The difference between the upper and lower curves is an approximation of the magnitude of the dipping effect.

FIG. 6 shows a graph of a dipping effect approximation. Like FIG. 5, the axes of FIG. 6 show true vertical depth (−250 to −50 feet) and conductivity (1 to 10,000 mS/m). The square curve is the estimated 1-D formation model based on raw measurements from an HRAI tool. Also shown are two curves. The upper curve is the numerically modeled response with a fiction deviated borehole. The lower curve is the numerically modeled response with a fiction vertical borehole. As in FIG. 5, the difference between the upper and lower curves is an estimate of the dipping effect.

FIG. 7 is a graph showing a comparison of logs before dipping correction versus after dipping correction. The corrected logs can be further processed or inverted as if they were from vertical wells.

A method similar to those described above corrects for the shoulder effect. This method is similar in the sense that it uses a comparison to a modeled induction tool response at zero dip as a baseline to evaluate the nonlinear shoulder effect.

As described in the background section, the shoulder effect is a well-known phenomenon that arises because an induction well logging tool measuring formation near bed boundary inevitably measures both of the adjoining layers of formation simultaneously. It is further known that the shoulder effect consists of both linear and nonlinear components. It is also known how to process the raw data to deal with the linear component of the shoulder effect. It is the nonlinear shoulder effect that causes difficulty in the interpretation the logs. The well-known Born approximation theory is normally used to calculate the responses of an induction tool with only the linear portion of the shoulder effect taking into account. While, the forward modeling with zero-degree dip takes both the linear and nonlinear portion into account. Therefore, with an earth model, the difference between the modeled response of zero-degree dip angle and the calculated response based on the Born Approximation theory is the nonlinear portion of the shoulder effect, or the nonlinear shoulder effect.

Figure 8:
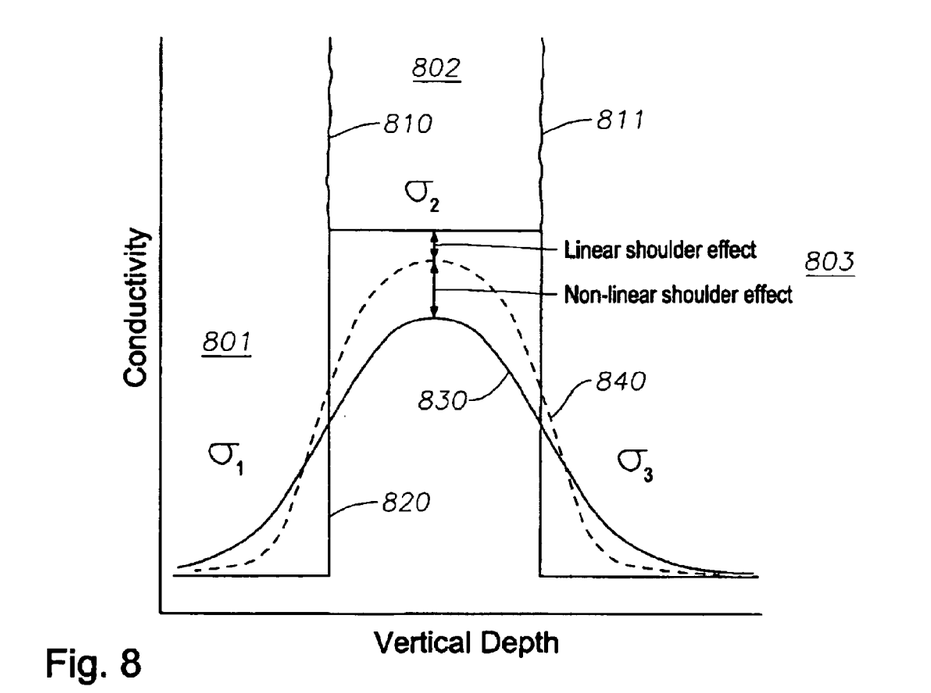
FIG. 8 illustrates an example of the linear and nonlinear portions of the shoulder bed effect.

FIG. 8 shows the shoulder-bed effect on a logging well induction tool response curve, and illustrates exemplary linear and non-linear portions of the shoulder-bed effect. FIG. 8 is merely exemplary and is not to scale.

Figure 9:
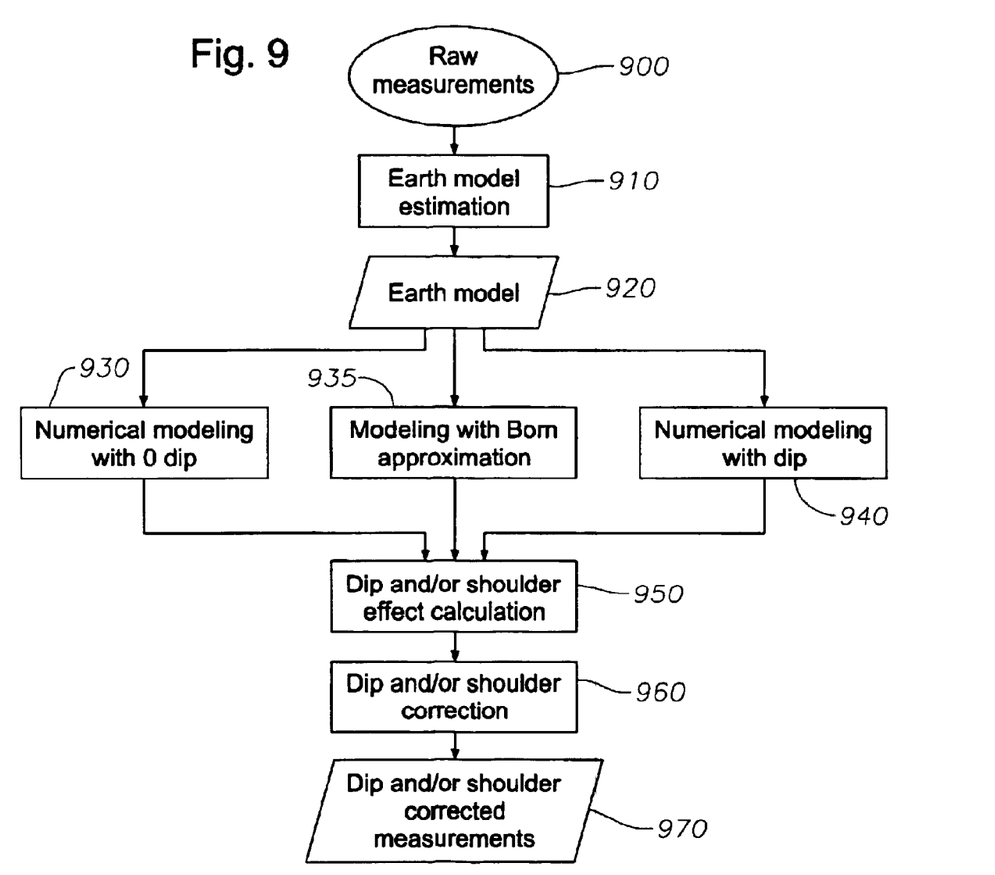
FIG. 9 shows a fourth method according to the invention.
Figure 10:
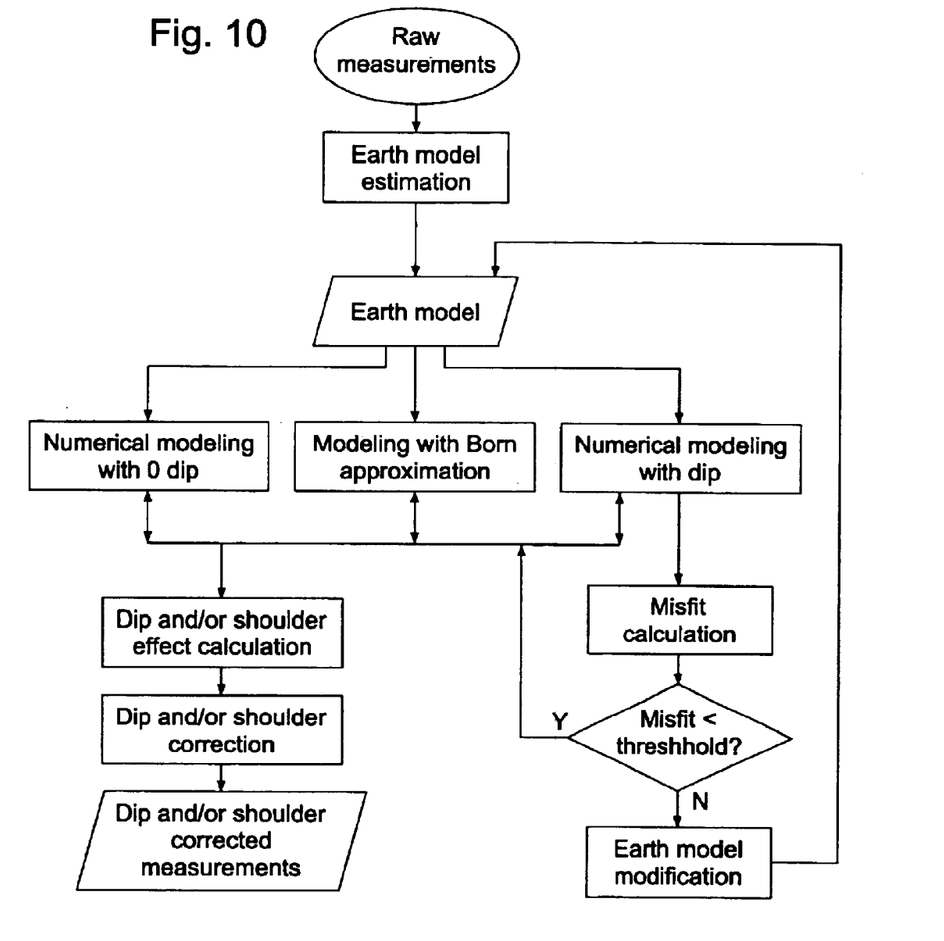
FIG. 10 shows a fifth method according to the invention.

The methods shown in FIGS. 9 and 10 correct for the nonlinear portion of the shoulder effect. The methods as described each utilize numerical forward modeling at zero dip, and thus correction for both the nonlinear shoulder effect and dip effect can be advantageously be used in conjunction in the same method. It should be noted, however, that correction for dip effect is not a necessary aspect to correcting for the nonlinear shoulder effect and the one or more steps of FIGS. 9 and 10 that correct for dip error are merely optional.

FIG. 9 shows a first method according to the invention. At step 900, the raw voltage measurements at the receiver(s) are obtained by the induction logging tool. These raw measurements may optionally be pre-processed by, e.g, filtering or by conversion to a corresponding conductivity, at step 900 as well.

An earth model estimation based upon the raw measurements is made at step 910. Such an earth model indicates the approximate conductivity for each bed or formation layer, as well as the depth of each bed boundary between the formation layers. Alternately, the earth model may already exist, or may be created from preexisting measurements. As is known to one of ordinary skill in the art, there are a number of approaches, techniques or methods of various accuracies to create the earth model.

Step 920 indicates the completed creation of the earth model. Given the earth model derived at step 920, and an accurate means to model tool response (such as forward modeling software), an expected tool response for a given depth in a formation can be numerically modeled. Such software or the like to model tool response will vary depending upon which tool is being modeled by the user. However, numerous such programs have been developed for various tools and it is within the ordinary skill of those in the art to develop such software for any given tool if it is not readily available.

At step 930, numerical forward modeling can be used to calculate the expected apparent conductivity for zero dip angle at the depth of interest. The result is referred to as the apparent conductivity at 0 dip, or $\sigma_a^{vertical}$. This measurement provides a baseline or standard for comparison from which the dip effect and nonlinear shoulder effect may be calculated as described.

At step 935, numerical forward modeling of the tool response based on the earth model of step 920 is executed by using the Born approximation at zero dip. As explained above, the Born approximation is a well known technique to approximately calculate the tool response based on a linear theory. The nonlinear portion of the shoulder effect is excluded from the calculation. Techniques other than the Born approximation are also known to approximately calculate the tool response and may be employed in lieu of the Born approximation. It should therefore be noted that step 935 includes alternate methods to calculate tool response based on a linear theory and that the invention is not limited to the Born approximation.

At step 940, the expected apparent conductivity is calculated at the same depth as at step 930 and 935, but at the given dip, similar to step 240 of FIG. 2.

The shoulder bed effect calculation and dip effect calculation is made at step 950. The nonlinear portion of the shoulder effect is calculated as the difference between the zero dip curve numerically modeled at step 930 and the curve created by the Born approximation (or equivalent) at step 935. The dip effect calculation is explained above in discussing steps 250 and 260 of FIG. 2.

The raw measurements are then corrected at step 960 for any given depth by adjusting the raw measurements by the magnitude of the nonlinear shoulder effect. The dip effect is also accounted for at step 960. This yields the shoulder bed and dip corrected measurements at step 970.

FIG. 10 is the method of FIG. 9, but with the earth model fine tuning approach of FIG. 3. The earth model fine tuning approach of FIG. 4 may also be incorporated into the method of FIG. 9.

The invention also may be viewed as a system that is capable of executing the error correction methods disclosed herein as well as other variants within the scope of the invention. Such a system might include a logging well induction tool to make the voltage measurements at the receivers that correspond to formation conductivity, and an associated processor or computer designed or programmed to execute steps of methods according to the invention. The processing may take place at any suitable location, including at the tool or above-ground. Visually, such a system might look like that shown in FIG. 1 although, as noted, the invention is not limited to any particular induction tool.

The above discussion is meant to be illustrative of the principles and various embodiments of the present invention. Numerous variations and modifications will become apparent to those skilled in the art once the above disclosure is fully appreciated. For example, not all of the steps in the disclosed methods must be executed in the order they were explained, and the claims that follow are not so limited. The invention is not limited by the type of electric well logging instrument used. It is intended that the following claims be interpreted to embrace all such variations and modifications.

What is claimed is:

1. A method to estimate measurement error for an induction well logging tool having at least one receiver, said measurement error corresponding to a formation at a given depth, said method comprising the steps of:

measuring voltage for said formation at said given depth by said induction well logging tool to yield a first set of measurements;

calculating a first induction tool response at said given depth based on an earth model of said formation, said earth model including one or more layers of varying conductivity corresponding to layers of said formation and defining at least one formation boundary in said formation, wherein said first induction tool response is calculated at zero dip angle for said induction well logging tool, said dip angle being defined as a relative angle between a longitudinal axis of said induction well logging tool and a direction normal to that of a first formation boundary;

calculating a second induction tool response at said given depth based on said earth model, wherein said induction tool response is calculated at a desired non-zero dip angle for said induction well logging tool;

subtracting said first tool response from said second tool response to yield an estimated measurement error for said first set of measurements.

2. The method of claim 1, further comprising correcting the induction well logging tool measurements by:

inserting said induction well logging tool into a borehole traversing said formation;

measuring a voltage at said receiver;

establishing an earth model approximating layer conductivities and depths for layer boundaries in said formation;

subtracting said dip error from said measured voltage.

3. The method of claim 1, wherein said first induction tool response is indicative of a first conductivity and said second induction tool response is indicative of a second conductivity.

4. The method of claim 1, further comprising the steps of:

comparing said second tool response to said measurement for said induction well logging tool inserted in a borehole in said formation to derive a difference value; and determining if said difference value is greater than a predetermined threshold;

wherein if said difference value is greater than said predetermined threshold, then revising said earth model.

5. The method of claim 4, wherein said earth model is revised by a reversion technique.

6. The method of claim 4, wherein said earth model is established based on measurements from said induction well logging tools.

7. The method of claim 1, said method being applied to induction tool measurements taken at a plurality of depths.

8. The method of claim 1, further comprising the steps of:
modeling a third induction tool response at said given depth with zero dip, said modeling excluding the non-linear portion of shoulder bed error due to adjacent beds;
comparing said modeled third induction tool response to said calculated first induction tool response to yield an approximation of a non-linear error for said shoulder-bed error.

9. The method of claim 8, wherein said step of modeling includes use of the Born approximation theory.

10. The method of claim 8, further comprising the steps of:
comparing said second tool response to said measurement for said induction well logging tool inserted in a borehole in said formation to derive a difference value; and
determining if said difference value is greater than a predetermined threshold;
wherein if said difference value is greater than said predetermined threshold, then revising said earth model.

11. The method of claim 1, further comprising:
subtracting said first induction tool response at said given depth from said voltage measurement to yield a difference value
wherein if said difference value is greater than a predetermined threshold value then revising said earth model.

12. The method of claim 1, wherein said method can be used during a logging while drilling program.

13. The method of claim 1, wherein said method can be used during a wireline logging program.

14. A system for determining induction tool measurement error, comprising;
an induction well logging tool having at least one transmitter and at least one receiver to measure voltage for current in a formation;
a processor programmed to calculate an approximate measurement error for said voltage, said processor programmed to
calculate a first induction tool response at said given depth based on an earth model of said formation, said earth model being based on characteristics of said formation and including one or more layers of varying conductivity defining at least one formation boundary in said formation, wherein said first induction tool response is calculated at zero dip angle for said induction well logging tool, said dip angle being defined as a relative angle between a longitudinal axis of said induction well logging tool and a direction normal to that of a first formation boundary;
calculate a second induction tool response at said given depth based on said earth model, wherein said induction tool response is calculated at a desired non-zero dip angle for said induction well logging tool;
subtract said first tool response from said second tool response to yield an estimated measurement error for said voltage.

15. The system of claim 14, said processor further programmed to
establish an earth model corresponding to conductivities and at least one bed boundary depth for said formation, each of said at least one bed boundaries being formed by at least two layers in said formation;
compare said second tool response to a measurement value for said induction well logging tool inserted in a borehole in said formation to derive a difference value; and
determine if said difference value is greater than a predetermined threshold;
wherein if said difference value is greater than said predetermined threshold, then revising said earth model.

16. The method of claim 14, said processor further programmed to
model a third induction tool response at said given depth with zero dip, said modeling excluding the nonlinear portion of error introduced by adjacent beds;
compare said modeled third induction tool response to said calculated first induction tool response to yield an approximation of a non-linear error for said shoulder-bed error.

17. The method of claim 14, said processor further programmed to
check a difference between said second tool response and a measurement from said induction well logging tool to determine if said difference is greater than a predetermined threshold value;
wherein if said difference is greater than said predetermined threshold value then revising said earth model.

18. A method to estimate measurement error for an induction well logging tool having at least one receiver, said induction well logging tool being inserted in a formation at a given depth, said method comprising:
calculate a first induction tool response at said given depth based on an earth model of said formation, said earth model being based upon said formation and including one or more layers of varying conductivity defining at least one formation boundary in said formation, wherein said first induction tool response is calculated at zero dip angle for said induction well logging tool, said dip angle being defined as a relative angle between a longitudinal axis of said induction well logging tool and a direction normal to that of said first formation boundary;
calculating a first shoulder bed error value, said shoulder bed error value being equal to said a conductivity of said earth model at said given depth minus a linear component for said measurement error;
subtracting said first induction tool response from said first shoulder bed error value to define a second shoulder bed error value, said second shoulder bed error value being a nonlinear component for said measurement error.

19. A system for determining dip error, comprising:
an induction logging tool having at least one transmitter and at least one receiver, said induction logging tool suitable for making voltage measurements regarding a formation proximate said receiver;
means for determining dip error in said induction logging tool voltage measurements based upon an earth model for said formation.

20. A system for determining nonlinear shoulder bed error, comprising:

an induction logging tool having at least one transmitter and at least one receiver, said induction logging tool suitable for making voltage measurements at said receiver;

means for determining nonlinear shoulder bed error in said induction logging tool voltage measurements.

21. A method to correct well logging measurements of a well logging tool for measurement errors, said measurements being taken at a plurality of depths in a formation, said measurement errors including a dip effect and a nonlinear shoulder effect, said method comprising the steps of:

establishing an earth model, based on measurements of said formation, approximating the conductivities and the depths of layer boundaries in said formation;

estimating the dip effect on the well logging measurements using said earth model;

estimating the nonlinear shoulder effect on the well logging measurements using said earth model;

subtracting the said dip effect and the said nonlinear shoulder effect from the said measurements to yield corrected measurements.

22. The method of claim 21, wherein said earth model can be revised by a reversion technique, further comprising:

measuring at least one voltage at each of said plurality of depths;

wherein said estimate of said nonlinear shoulder effect includes modeling said well logging tool at zero degree dip at said plurality of depths based on said earth model to yield a plurality of induction tool responses;

subtracting said induction tool responses at said given depths from said voltage measurements to yield a shoulder bed error value.

23. A method to estimate non-linear shoulder effect on induction well logging measurements from an induction well logging tool in a formation at a given depth, said method comprising the steps of:

calculating a first estimated induction tool response at said given depth based on said induction well logging tool and an estimated earth model, said estimated earth model approximating the conductivities and the depths of the layer boundaries in said formation, wherein said first tool response is calculated at a dip angle of zero degree;

modeling a second inductor tool response at said given depth based on said induction well logging tool and said estimated earth model, said second induction tool response being modeled at a relative dip angle of zero degree, said modeling assuming said induction well logging tool responds to formation conductivity linearly;

comparing said modeled second tool response to said calculated first tool response to yield the said nonlinear shoulder effect for said induction well logging measurements.

24. The method of claim 1, further comprising:

correcting said first set of measurements by said measurement error.

25. The system of claim 14, said processor further being programmed to correct said measurement by an amount equal to said measurement voltage.

26. The method of claim 20, further comprising:

measuring conductivities for said formation to yield measurements upon which said model is based.

* * * * *